United States Patent
Tsujita

(10) Patent No.: US 6,774,777 B2
(45) Date of Patent: Aug. 10, 2004

(54) TIRE CONDITION MONITORING APPARATUS

(75) Inventor: Yasuhisa Tsujita, Ogaki (JP)

(73) Assignee: Pacific Industrial Co., Ltd., Gifu-Ken (JP)

(*) Notice: Subject to any disclaimer, the term of this patent is extended or adjusted under 35 U.S.C. 154(b) by 0 days.

(21) Appl. No.: 10/131,373

(22) Filed: Apr. 24, 2002

(65) Prior Publication Data

US 2003/0098788 A1 May 29, 2003

(30) Foreign Application Priority Data

Nov. 28, 2001 (JP) ........................................ 2001-362810

(51) Int. Cl.$^7$ ............................................. B60C 23/00
(52) U.S. Cl. ...................... 340/445; 340/447; 73/146.5
(58) Field of Search ................................. 340/442, 443, 340/444, 445, 446, 447, 448; 73/146, 146.2, 146.3, 146.4, 146.5, 146.8; 116/34 R, 34 A, 34 B; 152/152.1

(56) References Cited

U.S. PATENT DOCUMENTS

| | | | |
|---|---|---|---|
| 3,873,965 A | * | 3/1975 | Garcia ........................ 340/445 |
| 4,067,235 A | | 1/1978 | Markland et al. |
| 4,686,855 A | * | 8/1987 | Smith ......................... 73/146.8 |
| 5,326,135 A | * | 7/1994 | Nakayama .................. 280/850 |
| 6,304,172 B1 | * | 10/2001 | Katou et al. ................. 340/445 |
| 6,392,607 B1 | * | 5/2002 | Gold et al. .................. 343/713 |
| 2001/0008083 A1 | | 7/2001 | Brown ......................... 73/146 |

FOREIGN PATENT DOCUMENTS

| | | | | |
|---|---|---|---|---|
| DE | 195 20 674 A1 | 12/1996 | | |
| WO | WO 02/21634 | * | 3/2002 | ................. 340/445 |

\* cited by examiner

Primary Examiner—Anh V. La
(74) Attorney, Agent, or Firm—Patterson, Thuente, Skaar & Christensen, P.A.

(57) ABSTRACT

A tire condition monitoring apparatus monitors the condition of a tire of a vehicle. The apparatus includes a transmitter, a receiving antenna, and a receiver. The transmitter wirelessly transmits data indicating the condition of the tire. The receiving antenna receives the data transmitted by the transmitter. The receiving antenna is attached to a non-metallic body of the vehicle that is located close to the tire. The receiver is installed in the vehicle for processing the data received by the receiving antenna.

14 Claims, 3 Drawing Sheets

Fig.3(a) Fig.3(b)
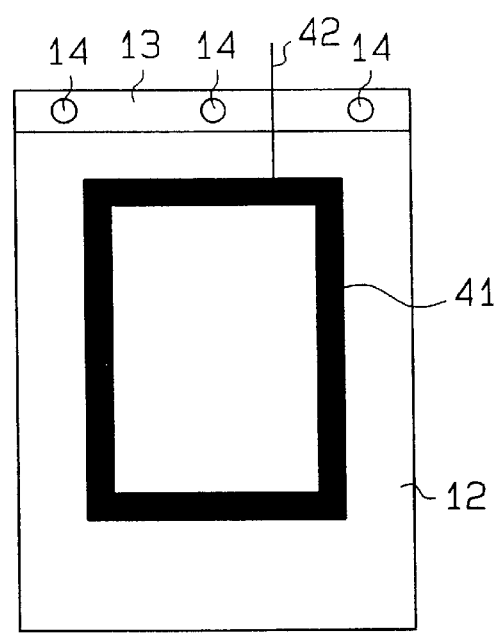
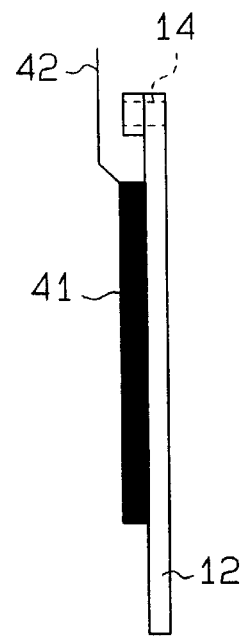
Fig.4
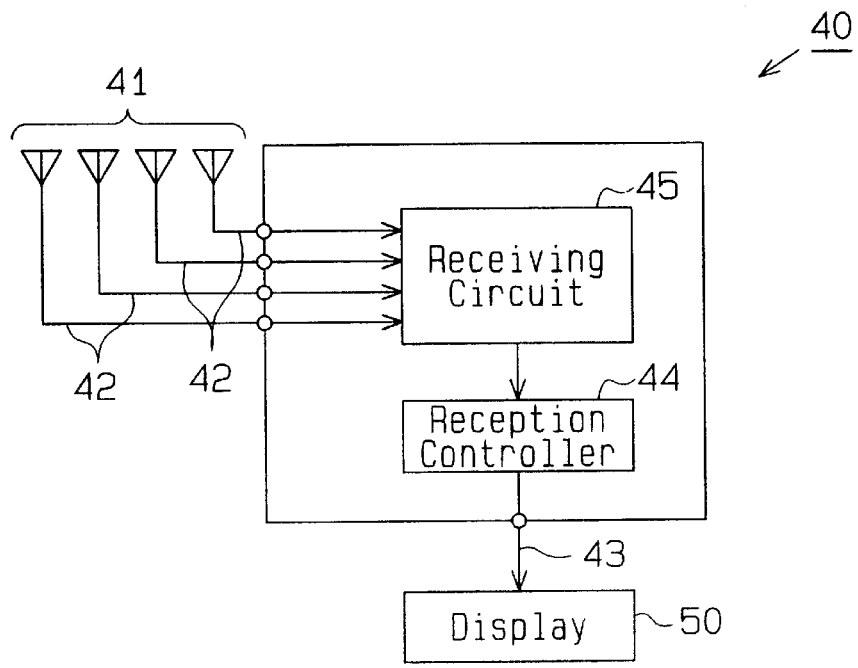

TIRE CONDITION MONITORING APPARATUS

BACKGROUND OF THE INVENTION

The present invention relates to tire condition monitoring apparatuses, and, more particularly, to wireless tire condition monitoring apparatuses that enable a driver to monitor the condition of a tire, such as air pressure, in a passenger compartment.

Wireless tire condition monitoring apparatuses have been proposed for enabling a driver of a vehicle to monitor the conditions of the tires in the passenger compartment. A typical wireless tire condition monitoring apparatus includes a plurality of transmitters and a receiver. Each of the transmitters is associated with a different one of the tires and is installed in the tire. The receiver is installed in the body frame of the vehicle. Each transmitter measures parameters indicating the condition of the associated tire, such as the air pressure and the temperature of the interior of the tire, and wirelessly transmits data based on the measurement to the receiver. The receiver receives the data from the transmitter via a receiving antenna, which is associated with the transmitter. The receiver then indicates the condition of the tire on a display, which is located, for example, near the driver seat in the passenger compartment.

However, the receiver may not be capable of receiving signals from the transmitter in a stable manner, depending on, for example, the location of the receiving antenna. In other words, if the receiving antenna is located close to a metal component of the vehicle, the metal component interferes with a radio wave transmitted by the transmitter. This significantly hampers the performance of the receiver. Further, radio wave regulations restrict the transmitting power of each transmitter. In addition, to prolong the lives of the batteries that power the transmitters, it is undesirable to raise the transmitting power of the transmitters. Particularly, a large vehicle, such as a truck, includes an increased number of tires, compared to an ordinary-size vehicle. Also, the large vehicle has a relatively large longitudinal dimension. This makes it difficult for a receiver installed in such a vehicle to stably receive the data from all transmitters, each of which is associated with a different one of the tires.

Accordingly, it is an objective of the present invention to provide a wireless tire condition monitoring apparatus that stably receives data transmitted by transmitters.

SUMMARY OF THE INVENTION

To achieve the foregoing and other objectives and in accordance with the purpose of the present invention, the invention provides an apparatus for monitoring the condition of a tire of a vehicle. The apparatus includes a transmitter, a receiving antenna, and a receiver. The transmitter is installed in the tire for wirelessly transmitting data indicating the condition of the tire. The receiving antenna receives the data transmitted by the transmitter. The receiving antenna is attached to a non-metallic body of the vehicle that is located close to the tire. The receiver is installed in the vehicle for processing the data received by the receiving antenna.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which:

FIG. 3(a) is a front view showing a mud guard to which a receiving antenna of the apparatus of FIG. 1 is attached;

FIG. 3(b) is a side view showing the mud guard of FIG. 3(a);

FIG. 4 is a block diagram showing a receiver installed in the apparatus of FIG. 1;

DETAILED DESCRIPTION OF THE PREFERED EMBODIMENTS

An embodiment of the present invention, or a wireless tire condition monitoring apparatus 1, will now be described with reference to FIGS. 1 to 4.

Figure 1:
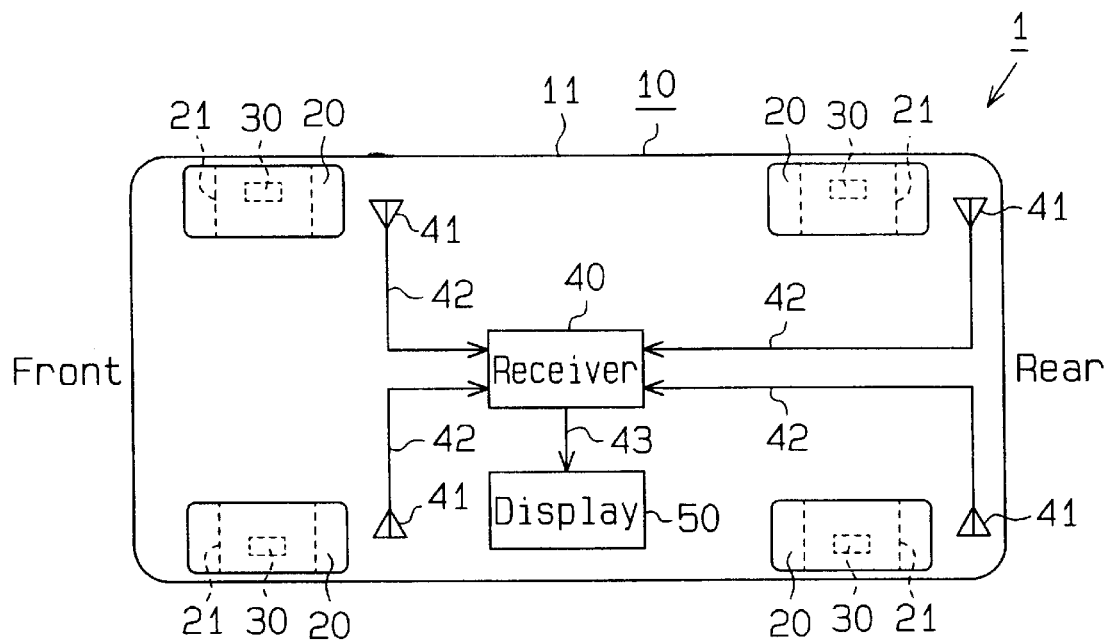
FIG. 1 is a block diagram showing a tire monitoring apparatus according to an embodiment of the present invention.

With reference to FIG. 1, the tire condition monitoring apparatus 1 includes four transmitters 30 and a single receiver 40. Each of the transmitters 30 is associated with a different one of four tires 20 of a vehicle 10. The receiver 40 is installed in a body frame 11 of the vehicle 10.

Each transmitter 30 is fixed to a wheel 21 such that the transmitter 30 is located in the associated tire 20. Each transmitter 30 measures parameters indicating the condition of the associated tire 20 or the air pressure of the tire 20. The transmitter 30 then wirelessly transmits data including air pressure data, which is obtained from the measurement, to the receiver 40.

The receiver 40 is installed at a predetermined location in the body frame 11 and is powered by, for example, a battery (not shown) located in the vehicle 10. The receiver 40 includes four receiving antennas 41, each of which is associated with a different one of the four transmitters 30. Each receiving antenna 41 is connected to the receiver 40 by a cable 42. It is preferred that the cables 42 be coaxial cables, which are hardly affected by noise. The receiver 40 receives a signal from each of the transmitters 30, mainly by the associated receiving antenna 41.

A display 50 is located at a position visible from the driver of the vehicle 10. The display 50 is connected to the receiver 40 by a cable 43.

Figure 2:
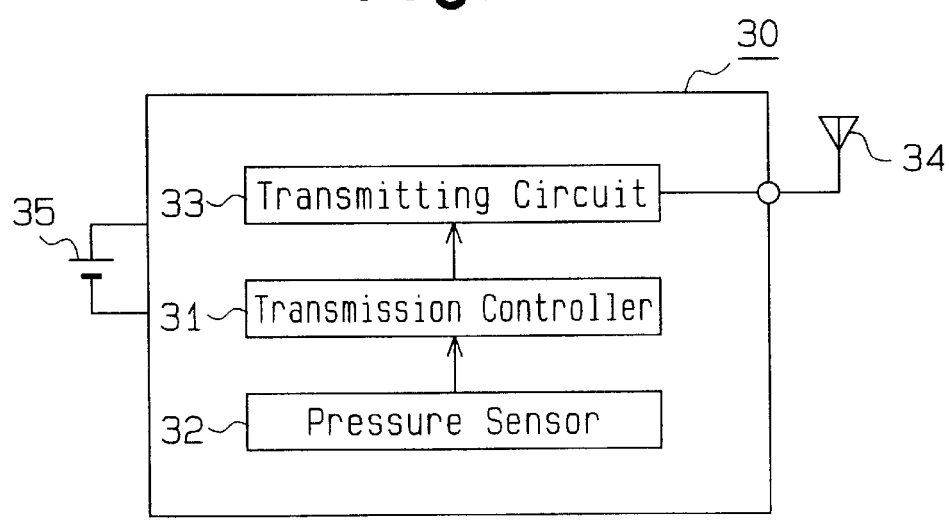
FIG. 2 is a block diagram showing a transmitter installed in the apparatus of FIG. 1.

With reference to FIG. 2, each of the transmitters 30 includes a transmission controller 31, which is formed by, for example, a microcomputer. The transmission controller 31 includes, for example, a central processing unit (CPU), a read only memory (ROM), and a random access memory (RAM). A specific identification (ID) code is pre-registered in an internal memory, for example, the ROM, of each transmitter 31. The identification codes identify the four transmitters 30.

In each transmitter 30, a pressure sensor 32 measures the air pressure of the associated tire 20 and transmits air pressure data based on the measurement to the transmission controller 31. The transmission controller 31 then supplies a transmitting circuit 33 with data including a signal indicating the received air pressure data and the specific ID code registered in the internal memory of the transmitter 30. Subsequently, the transmitting circuit 33 encodes and modulates the data from the transmission controller 31 before wirelessly transmitting the data by a transmitting antenna 34. Each transmitter 30 includes a battery 35, which powers the transmitter 30.

With reference to FIGS. 3(a) and 3(b), the receiving antennas 41 are each attached to a mud guard of a different one of the tires 20. The mud guards 12 protect the body frame 11 from mud or rain water splashed by the associated tires 20. The mud guards 12 are each fixed to the body frame 11 by metal stays 13 and bolts 14. The mud guards 12 are formed of non-metallic insulating bodies, such as synthetic resin bodies. This prevents the radio waves transmitted by the transmitters 30 from being interfered by metal bodies. The performance of the receiver 40 is thus maintained. Each receiving antenna 41 is a so-called loop antenna, which is formed by winding an electric cable for a predetermined turns. More specifically, each receiving antenna 41 is attached to the side of the mud guard 12 that faces the associated tire 20.

With reference to FIG. 4, the receiver 40 includes a reception controller 44 and a receiving circuit 45, which process received data. The reception controller 44, which is formed by, for example, a microcomputer, includes a CPU, an ROM, and an RAM. When one of the transmitters 30 transmits data to the receiver 40, the receiving circuit 45 receives the data from the transmitter 30 mainly by the associated receiving antenna 41. The receiving circuit 45 then demodulates and decodes the received data before transmitting the data to the reception controller 44.

Based on the received data, the reception controller 44 recognizes the air pressure of the tire 20 associated with the transmitter 30, which is the origin of the data. The reception controller 44 then indicates the air pressure data on the display 50. Particularly, if the air pressure of the tire 20 is abnormal, the reception controller 44 indicates so on the display 50.

The illustrated embodiment has the following effects.

(1) The mud guards 12, to which the receiving antennas 41 are attached, are formed of non-metallic bodies and are spaced from any metallic bodies, including the body frame 11. This prevents the performance of the receiver 40 from being significantly hampered by any metallic body interfering with radio waves transmitted by the transmitters 30. The receiver 40 thus stably receives and processes the data from the transmitters 30. This enables the receiver 40 to indicate a abnormal state of the air pressure of any of the tires 20 on the display 50, if that is the case.

(2) Each of the receiving antennas 41 is attached to the side of the mud guard 12 that faces the associated tire 20. The receiving antennas 41 are thus invisible from behind the vehicle 10. This maintains the appearance of the vehicle 10 regardless of the receiving antennas 41. Further, the receiver 40 stably receives the data from the transmitters 30.

(3) The receiving antennas 41 are configured simply by attaching a looped electric wire to each mud guard 12. That is, the receiving antennas 41 have a simple structure. Further, the manufacturing cost of the receiving antennas 41 is relatively low.

It should be apparent to those skilled in the art that the present invention may be embodied in many other specific forms without departing from the spirit or scope of the invention. Particularly, it should be understood that the invention may be embodied in the following forms.

Figure 5A:
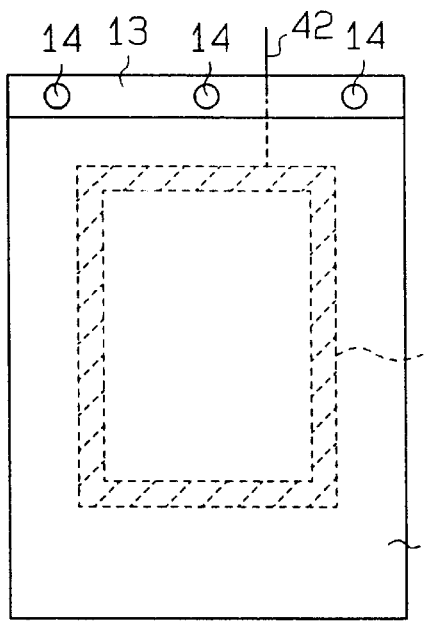
FIG. 5(a) is a front view showing a modification of a mud guard with a built-in receiving antenna.
Figure 5B:
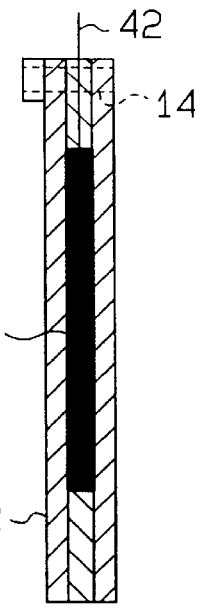
FIG. 5(b) is a cross-sectional view showing the mud guard of FIG. 5(a)

With reference to FIGS. 5(a) and 5(b), each of the receiving antennas 41 may be built in a mud guard 112. In this case, each of the mud guards 112 may be formed by a pair of resin sheets that clamp the receiving antenna 41. Alternatively, each receiving antenna 41 may be embedded integrally in the associated mud guard 112 during molding of the mud guard 112. In either case, the receiving antennas 41 are completely invisible from the exterior, thus maintaining the appearance of the mud guards 112. Further, the receiver 40 stably receives data from the transmitters 30. In addition, since the receiving antennas 41 are not exposed to the exterior, the receiving antennas 41 are reliably prevented from being damaged or deteriorated.

Figure 6A:
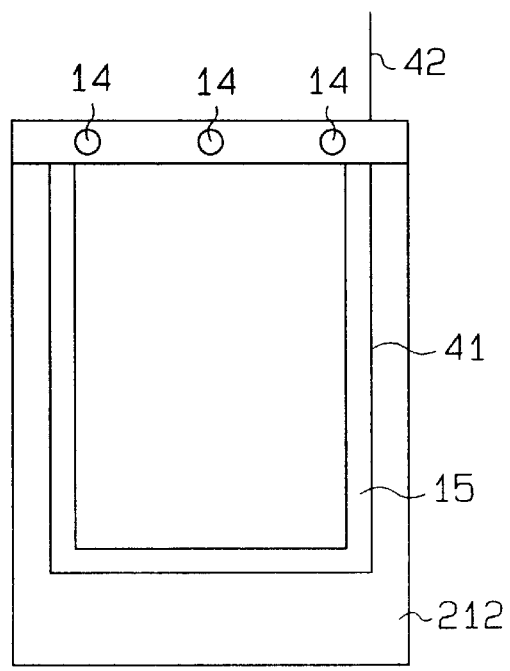
FIG. 6(a) is a front view showing a modification of a mud guard and a deflection stopper.
Figure 6B:
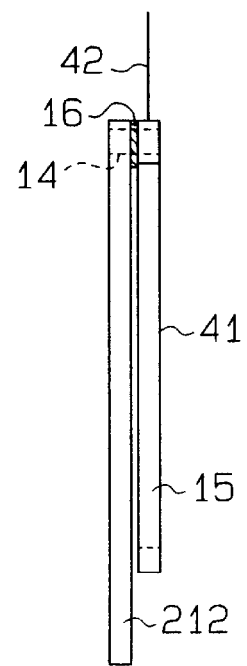
FIG. 6(b) is a side view showing the mud guard and the deflection stopper of FIG. 6(a).

A mud guard 212 illustrated in FIGS. 6(a) and 6(b) is used for a large vehicle, such as a truck. A deflection stopper 15, which prevents the mud guard 212 from being deflected, is located at a position opposed to the mud guard 212 (at the side of the mud guard 212 opposed to the side that faces the tire 20). The deflection stopper 15 is normally formed of conductive material, such as metal. The deflection stopper 15 is formed integrally with a metal stay 13 or is connected to the stay 13. In this manner, the stay 13 and the deflection stopper 15 form a loop. Thus, the stay 13 and the deflection stopper 15 may function together as each receiving antenna 41. More specifically, the stay 13 and the bolt 14, which are formed of metal, are electrically insulated from the body frame 11 by a non-metallic body (an insulating body) 16, such as a resin spacer. This enables the deflection stopper 15 to stop deflection of the mud guard 212 and function also as the receiving antenna 41. It is thus unnecessary to install the receiving antennas 41 separately. This reduces the cost otherwise needed for the receiving antennas 41.

In the embodiments illustrated in FIGS. 1 to 5(b), the receiving antennas 41 may be formed by looped metal plates.

The receiving antennas 41 may be each located at a portion of a side spoiler formed of insulating material including polypropylene (PP) or ABS resin, or a portion of a side spoiler that is located closest to the associated tire 20.

The receiving antennas 41 may be each located at a portion of a rear-under spoiler formed of insulating material including polypropylene (PP) or ABS resin, or a portion of a rear-under spoiler that is located closest to the associated tire 20.

If the vehicle 10 is provided with side steps, as in the case of a sport utility vehicle, the receiving antennas 41 may be installed in non-metallic bodies, such as resin moldings, of the side steps.

A warning beeper may be installed in the vehicle 10 such that a beep indicates an abnormal state of the air pressure of any of the tires 20. Alternatively, a conventional speaker installed in the vehicle 10 may function as the warning beeper.

The air pressure data transmitted by each of the transmitters 30 may specify the measurement of the air pressure of the associated tire 20. Alternatively, the data may simply indicate whether or not the air pressure of the tire 20 is in an acceptable range.

A temperature sensor may be provided in each of the transmitters 30. In this case, each transmitter 30 wirelessly transmits data regarding the temperature of the interior of the associated tire 20, in addition to the air pressure data, as the condition of the tire 20.

The vehicle 10 does not necessarily have to be a four-wheel vehicle. That is, the present invention may be applied to a two-wheel vehicle, such as a bicycle and a motorcycle, or a bus or a towed vehicle or an industrial vehicle (for example, a forklift). If the present invention is applied to the towed vehicle, the receiver 40 and the display 50 are installed in the towed vehicle.

The present examples and embodiments are to be considered as illustrative and not restrictive and the invention is not to be limited to the details given herein, but may be modified within the scope and equivalence of the appended claims.

What is claimed is:

1. An apparatus for monitoring the condition of a tire of a vehicle, comprising:
   a transmitter, which is installed in the tire, wherein the transmitter wirelessly transmits data indicating the condition of the tire;
   a receiving antenna, wherein the receiving antenna receives the data transmitted by the transmitter, and the receiving antenna is attached to a non-metallic body of the vehicle that is located close to the tire; and
   a receiver installed in the vehicle and connected to the receiving antenna by a cable, wherein the receiver processes the data received by the receiving antenna and the receiving antenna is remote from any receiver carried by the vehicle, wherein the non-metallic body is a mud guard and the receiving antenna is built in the mud guard.

2. The apparatus according to claim 1, wherein the receiving antenna is installed in the non-metallic body such that the receiving antenna is invisible from behind the vehicle.

3. The apparatus according to claim 1, wherein the receiving antenna is located at the side of the mud guard that faces the tire of the vehicle.

4. An apparatus for monitoring the condition of a tire of a vehicle, comprising:
   a transmitter, which is installed in the tire, wherein the transmitter wirelessly transmits data indicating the condition of the tire;
   a receiving antenna, wherein the receiving antenna receives the data transmitted by the transmitter, and the receiving antenna is attached to a non-metallic body of the vehicle that is located close to the tire;
   and a receiver installed in the vehicle and connected to the receiving antenna by a cable, wherein the receiver processes the data received by the receiving antenna and the receiving antenna is remote from any receiver carried by the vehicle, wherein the non-metallic body is a mud guard and a deflection stopper is attached to the mud guard that stops deflection of the mud guard, and the deflection stopper functions also as the receiving antenna.

5. The apparatus according to claim 4, wherein the deflection stopper is electrically insulated from a body frame of the vehicle by an insulating body.

6. The apparatus according to claim 4, wherein the receiving antenna is installed in the non-metallic body such that the receiving antenna is invisible from behind the vehicle.

7. The apparatus according to claim 4, wherein the receiving antenna is located at the side of the mud guard that faces the tire of the vehicle.

8. An apparatus for monitoring air pressure of a tire of a vehicle, comprising:
   a transmitter, wherein the transmitter wirelessly transmits data indicating the air pressure of the tire, and the transmitter includes a sensor for acquiring air pressure data of the tire;
   a receiving antenna, wherein the receiving antenna receives the data transmitted by the transmitter, and the receiving antenna is attached to a mud guard of the vehicle that is located close to the tire; and
   a receiver installed in the vehicle and connected to the receiving antenna by cable, wherein the receiver processes the data received by the receiving antenna and no receiver is located on the mud guard with the receiving antenna, wherein the receiving antenna is built in the mud guard.

9. The apparatus according to claim 8, wherein the receiving antenna is installed in the non-metallic body such that the receiving antenna is invisible from behind the vehicle.

10. The apparatus according to claim 8, wherein the receiving antenna is located at the side of the mud guard that faces the tire of the vehicle.

11. An apparatus for monitoring air pressure of a tire of a vehicle, comprising:
    a transmitter, wherein the transmitter wirelessly transmits data indicating the air pressure of the tire, and the transmitter includes a sensor for acquiring air pressure data of the tire;
    a receiving antenna, wherein the receiving antenna receives the data transmitted by the transmitter, and the receiving antenna is attached to a mud guard of the vehicle that is located close to the tire; and
    a receiver installed in the vehicle and connected to the receiving antenna by cable, wherein the receiver processes the data received by the receiving antenna and no receiver is located on the mud guard with the receiving antenna, wherein a deflection stopper is attached to the mud guard that stops deflection of the mud guard, and the deflection stopper functions also as the receiving antenna.

12. The apparatus according to claim 11, wherein the deflection stopper is electrically insulated from a body frame of the vehicle by an insulating body.

13. The apparatus according to claim 11, wherein the receiving antenna is installed in the non-metallic body such that the receiving antenna is invisible from behind the vehicle.

14. The apparatus according to claim 11, wherein the receiving antenna is located at the side of the mud guard that faces the tire of the vehicle.

* * * * *